United States Patent
Chao et al.

(10) Patent No.: US 7,031,795 B2
(45) Date of Patent: Apr. 18, 2006

(54) SYSTEM AND METHOD OF COINSURANCE WAFER MANAGEMENT

(75) Inventors: Jen-Lin Chao, Hsinchu (TW); Chin-Yung Chang, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 34 days.

(21) Appl. No.: 10/797,824

(22) Filed: Mar. 10, 2004

(65) Prior Publication Data

US 2005/0203658 A1    Sep. 15, 2005

(51) Int. Cl.
*G06F 19/00* (2006.01)

(52) U.S. Cl. ...................... 700/121; 700/112
(58) Field of Classification Search .............. 700/99, 700/100, 101, 112, 113, 121; 438/8, 14
See application file for complete search history.

(56) References Cited

U.S. PATENT DOCUMENTS

| | | | |
|---|---|---|---|
| 6,584,369 B1* | 6/2003 | Patel et al. | 700/100 |
| 6,687,563 B1* | 2/2004 | Wang et al. | 700/121 |
| 6,716,648 B1* | 4/2004 | Iriki | 438/14 |
| 6,799,311 B1* | 9/2004 | Ryskoski | 438/14 |
| 2001/0007795 A1* | 7/2001 | Kawamura et al. | 438/692 |
| 2002/0129901 A1* | 9/2002 | Fujikawa et al. | 156/345.31 |

* cited by examiner

*Primary Examiner*—Leo Picard
*Assistant Examiner*—Charles Kasenge
(74) *Attorney, Agent, or Firm*—Thomas, Kayden, Horstemeyer & Risley

(57) ABSTRACT

A system and method of coinsurance wafer management. The system includes at least one production line and an order management unit. The production line processes a MPW shuttle including original wafers and coinsurance wafers with a common fabrication process before metal layering, processes the original wafers with different metal layering fabrication processes according to a metal layering technology of each device design of the MPW shuttle, and withholds the coinsurance wafers without further fabrication. The order management unit receives a request for a designated device design before a cutoff date, and the production line releases and processes coinsurance wafers with the metal layering fabrication process corresponding to the designated device design when the request is received.

33 Claims, 7 Drawing Sheets

| Customer Code | Device Name | Lot ID | Wafer ID | Technology | Fab | Tape-in Date |
|---|---|---|---|---|---|---|
| A023 | TMB934_C15 | D62600 | 05;06;07;08;09;10;11;12;13;14 | 0.18 | 4A | 6/5/2001 |
| A458 | TMB934_C11 | D62600 | 05;06;07;08;09;10;11;12;13;14 | 0.18 | 4A | 6/5/2001 |
| E288 | TMB934_C3 | D62600 | 03;04 | 0.18 | 4A | 6/5/2001 |
| J181 | TMB934_C5 | D62600 | 05;06;07;08;09;10;11;12;13;14 | 0.18 | 4A | 6/5/2001 |
| U363 | TMB934_C7 | D62600 | 05;06;07;08;09;10;11;12;13;14 | 0.18 | 4A | 6/5/2001 |
| U376 | TMB934_C4 | D62600 | 03;04 | 0.18 | 4A | 6/5/2001 |
| U446 | TMB934_C8 | D62600 | 01;02 | 0.18 | 4A | 6/5/2001 |
| U583 | TMB934_C9 | D62600 | 05;06;07;08;09;10;11;12;13;14 | 0.18 | 4A | 6/5/2001 |
| U706 | TMB934_C2 | D62600 | 05;06;07;08;09;10;11;12;13;14 | 0.18 | 4A | 6/5/2001 |
| U759 | TMB934_C6 | D62600 | 05;06;07;08;09;10;11;12;13;14 | 0.18 | 4A | 6/5/2001 |
| U800 | TMB934_C12 | D62600 | 03;04 | 0.18 | 4A | 6/5/2001 |

FIG. 4A

| FIG. 4A |
|---|
| FIG. 4B |

| Process | #P#M | User Type | Committed Date | Coinsurance Wafer ID |
|---|---|---|---|---|
| MiM | 1P6M+ | Customer | 9/5/2001 | 15;16 |
| MiM | 1P6M+ | Customer | 9/5/2001 | 15;16 |
| MiM | 1P6M+ | Customer | 9/10/2002 | 15;16 |
| MiM | 1P6M+ | Customer | 9/5/2001 | 15;16 |
| MiM | 1P6M+ | Customer | 9/5/2004 | 15;16 |
| MiM | 1P6M+ | Customer | 9/10/2002 | 15;16 |
| MiM | 1P6M+ | Customer | 9/15/2002 | 15;16 |
| MiM | 1P6M+ | Customer | 9/5/2007 | 15;16 |
| MiM | 1P6M+ | Customer | 9/5/2007 | 15;16 |
| MiM | 1P6M+ | Customer | 9/5/2007 | 15;16 |
| MiM | 1P6M+ | Customer | 9/10/2002 | 15;16 |

FIG. 4B

SYSTEM AND METHOD OF COINSURANCE WAFER MANAGEMENT

BACKGROUND

The present invention relates to wafer management, and particularly to a system and method of coinsurance wafer management for use in MPW (Multi-Project Wafer) shuttle service that manages process scheduling of the coinsurance wafers and provides a business model that makes good use of the coinsurance wafers.

Development of IC (Integrated Circuit) fabrication technology in the semiconductor industry has lead to exponential growth in mask cost for each process. Taiwan Semiconductor Manufacturing Company (TSMC) has developed a foundry industry device prototyping service called Cyber shuttle or MPW shuttle service enabling designers to explore the benefits of leading-edge technology without committing to large volume wafer starts, and helping clients to shorten their new design development and reduce the development costs, including mask costs, during trial production and characteristic evaluation of the real chip trial stage. In addition, the MPW shuttle service dramatically reduces NRE (Non-Recurring Engineering) charges for small wafer volumes, enabling fast, low-cost prototyping.

The MPW shuttle service enables different clients to book an MPW shuttle and deliver their product design to the MPW shuttle service provider. Once all of the design information is received, each design is translated and produced on a common mask with appropriate allocation. Subsequent to IC fabrication, the MPW shuttle service provider delivers the ICs to the corresponding clients.

FIG. 1 illustrates a schematic diagram of the MPW shuttle service. In FIG. 1, a mask 110 including product designs A (111), B (112) and C (113) is commonly produced for different clients. The mask 110 is transferred to each die 101 of the wafer 100 by photolithography. Subsequent to IC fabrication, the MPW shuttle service provider delivers IC products A (120), B (130) and C (140) to the corresponding clients. The MPW shuttle service enables clients to share costs by producing a common mask for rapid processing of new products and designs to silicon-proven verification status.

In IC fabrication using one mask for one device, a number of insurance wafers are prepared as backup wafers for the original wafers that are scrapped in the process, in which the insurance wafers and the original wafers are processed with the same process. Since this type of the fabrication includes only one device on a wafer, it is clear that the insurance wafers belong to the device owner, and the insurance wafers may be provided to the device owner at no cost if the quantity of the original wafers scrapped in the process is less than that of the insurance wafers.

In another type of IC fabrication using one mask for several devices, such as the MPW shuttle service, a number of backup wafers are prepared as replacements if the original wafers are scrapped in the process. Since the wafers may be produced into different devices using a common mask and these devices belong to different device owners, the backup wafers are called "coinsurance wafers" belonging to all device owners. However, the information of the coinsurance wafers cannot be disclosed in detail or freely disclosed due to confidentiality considerations.

With the advance of IC fabrication, only a few of the coinsurance wafers become replacements due to process failure. However, since device owners cannot receive sufficient information regarding the coinsurance wafers, the MPW shuttle service provider or foundry and the device owners cannot make good use of the coinsurance wafers, resulting in scrapping of the coinsurance wafers and increased production costs. In addition, if the device owners need more wafers, they have to restart a complete wafer fabrication process, thereby increasing the cycle time of fabrication and related costs.

SUMMARY

The present invention is proposed to solve the aforementioned issues. It should be noted that, although this invention will be described from the perspective of an IC foundry, its concept and spirit should not be limited to IC foundries but may be applicable to other factories, service suppliers and products.

Accordingly, it is an object of the present invention to provide a system and method of coinsurance wafer management for use in MPW shuttle service that manages process scheduling of the coinsurance wafers.

It is another object of the present invention to provide a system and method of coinsurance wafer management including a new business model that makes good use of the coinsurance wafers.

To achieve the above objects, the present invention provides a system and method of coinsurance wafer management. According to one embodiment of the invention, the system includes at least a production line to process at least a MPW shuttle including a plurality of original wafers and a quantity of coinsurance wafers with a common fabrication process before metal layering, process the original wafers with different metal layering fabrication processes according to the metal layer technology of each device design of the MPW shuttle, and withhold the coinsurance wafers from further fabrication.

The production line further releases at least one of the coinsurance wafers to replace each corresponding original wafer scrapped in the common fabrication process, and processes it with the corresponding metal layering fabrication process.

The production line further splits the MPW shuttle into a plurality of child lots according to the metal layering technology of each device design of the MPW shuttle when the common fabrication process is complete, in which one child lot comprises the coinsurance wafers, and the other child lots are processed with different metal layering fabrication processes.

The system further includes an order management unit to receive a request for at least one designated device design after the metal layering fabrication processes and before a cutoff date of the MPW shuttle, and the production line releases at least one of the coinsurance wafers, and processes it with the corresponding metal layering fabrication process when the request is received.

The system further includes a transmission unit to transfer information of the coinsurance wafers, and of the original wafers corresponding to the respective device designs to the corresponding clients via a network.

According to another embodiment of the invention, a method of coinsurance wafer management first processes at least a MPW shuttle with a common fabrication process before metal layering, in which the MPW shuttle includes a plurality of original wafers and a quantity of coinsurance wafers. Then, the original wafers are processed with different metal layering fabrication processes according to a metal layering technology for each device design of the MPW shuttle, and the coinsurance wafers are withheld without further fabrication.

The method further releases at least one of the coinsurance wafers to replace each corresponding original wafer scrapped in the common fabrication process, and processes it with the corresponding metal layering fabrication process.

The method further splits the MPW shuttle into a plurality of child lots according to the metal layering technology of each device designs of the MPW shuttle when the common fabrication process is complete, in which one child lot comprises the coinsurance wafers, and the other child lots are processed with different metal layering fabrication processes.

The method further receives a request for at least one designated device design after the metal layering fabrication processes and before a cutoff date of the MPW shuttle. When the request is received, at least one coinsurance wafer is released, and processed with the corresponding metal layering fabrication process.

The method further transfers information of the coinsurance wafers and information of the original wafers corresponding to the respective device designs to the corresponding clients via a network.

The above-mentioned method may take the form of program code embodied in a tangible media. When the program code is loaded into and executed by a machine, the machine becomes an apparatus for practicing the invention.

One feature of the present invention is withholding of the coinsurance wafers processed from common fabrication process before metal layering, such that time for remaining fabrication processes is reduced if the coinsurance wafers are needed as supplements.

Another feature of the present invention is provision of sufficient information to clients to make decisions regarding application of the coinsurance wafers rather than a new wafer start, thereby reducing the cycle time of fabrication and related costs.

A detailed description is given in the following embodiments with reference to the accompanying drawings.

BRIEF DESCRIPTION OF THE DRAWINGS

The aforementioned objects, features and advantages of this invention will become apparent by referring to the following detailed description of the preferred embodiment with reference to the accompanying drawings, wherein:

FIGS. 4A and 4B show an example of information of the MPW shuttle;

DESCRIPTION

The present invention provides a system and method for overcoming conventional coinsurance wafer management problems in the MPW shuttle service.

Figure 1:
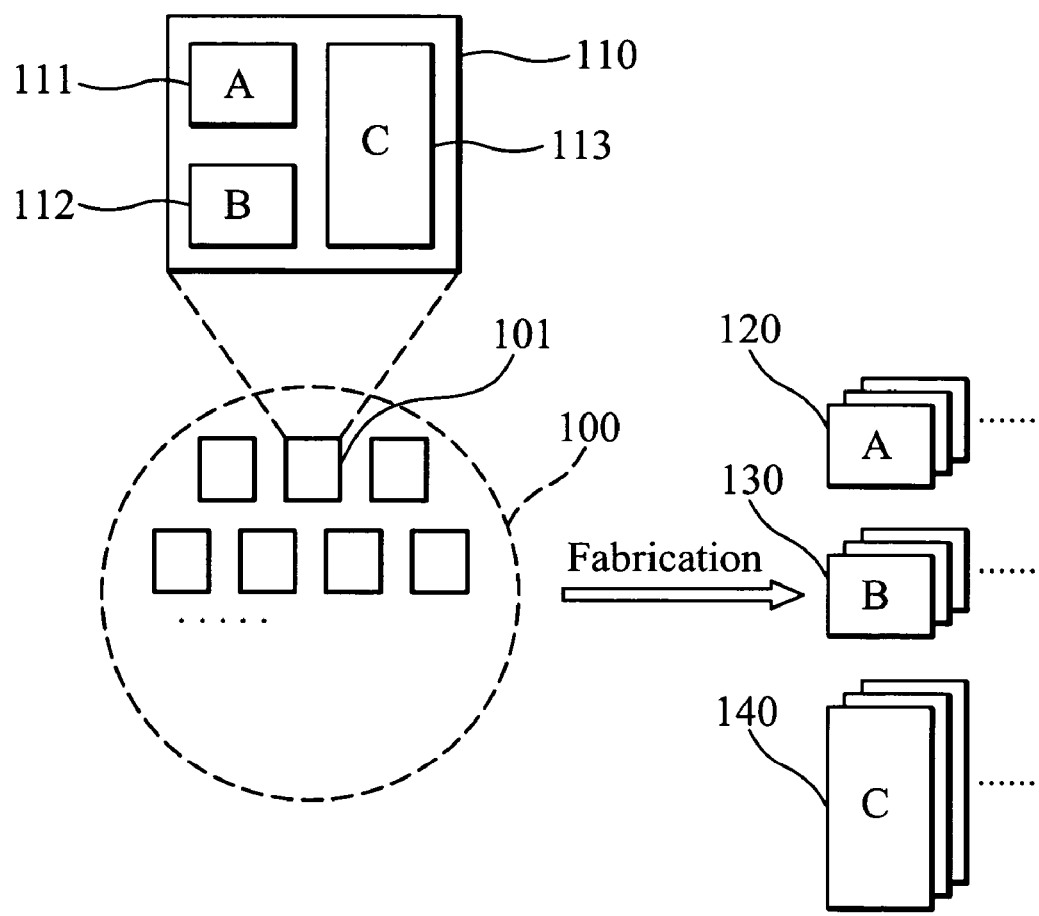
FIG. 1 is a schematic diagram illustrating the MPW shuttle service.
Figure 2:
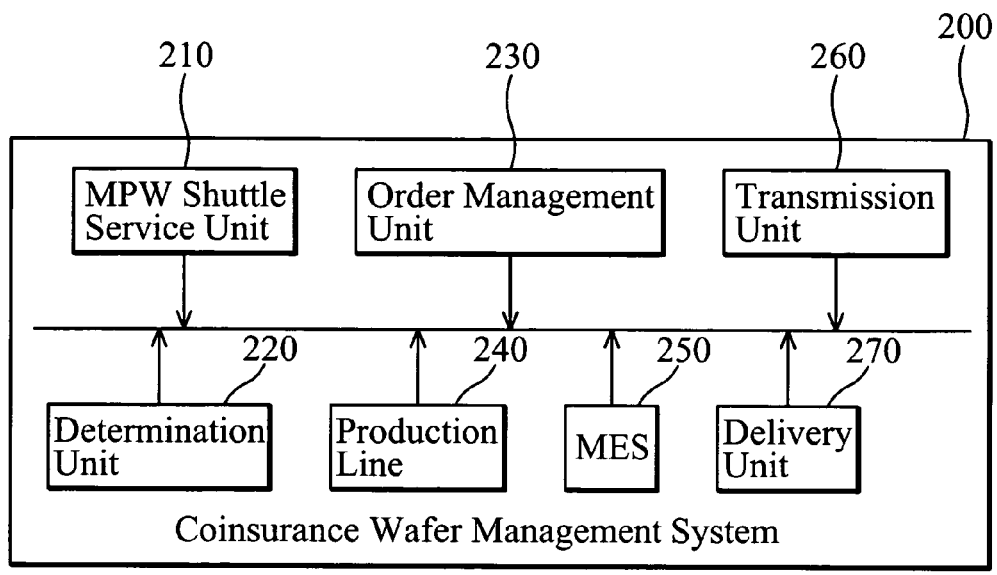
FIG. 2 is a schematic diagram illustrating the architecture of the coinsurance wafer management system according to one embodiment of the present invention.

FIG. 2 illustrates the architecture of the coinsurance wafer management system 200 according to one embodiment of the present invention. The system 200 includes a MPW shuttle service unit 210, a determination unit 220, an order management unit 230, a production line 240, a MES (Manufacturing Execution System) 250, a transmission unit 260, and a delivery unit 270.

The MPW shuttle service unit 210 provides related information of the MPW shuttles, such as reservation status. Clients may use the MPW shuttle service unit 210 to book a specific MPW shuttle for their device designs, and provide mask data of their device designs to the system. The determination unit 220 may determine the quantity of coinsurance wafers according to a scrapping rate and the quantity of original wafers reserved in a MPW shuttle, in which the "original" wafers represent wafers needed by the MPW shuttle. The quantity of original wafers can be calculated according to the requested quantity, size and allocation of the booked device designs, and the scrapping rate can be obtained by analyzing the related manufacturing history.

Figure 3:
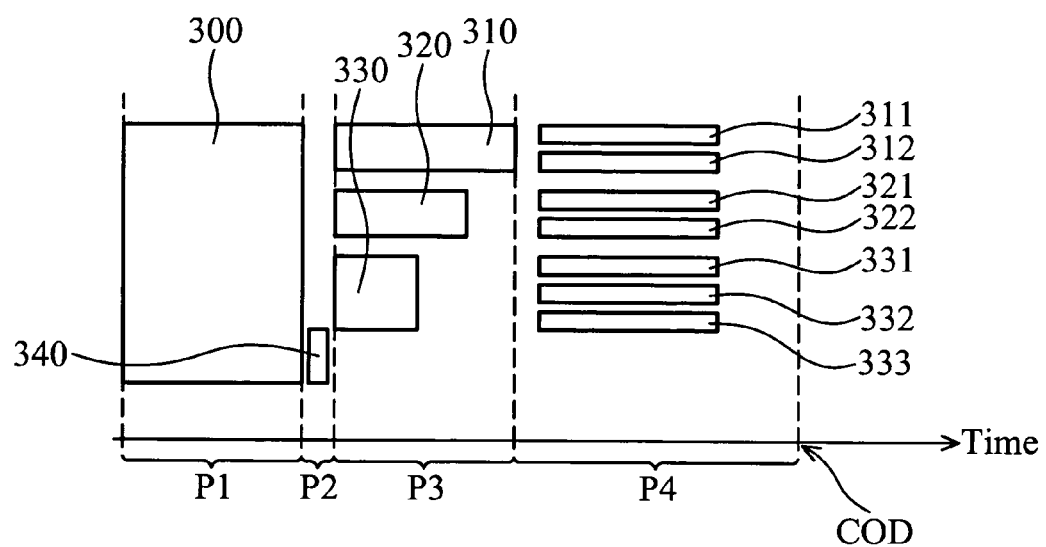
FIG. 3 is a schematic diagram illustrating the production period of a MPW shuttle according to one embodiment of the present invention.

After a common mask is produced according to the prepared mask data, the production line 240 may start the MPW shuttle and fabricate wafers. FIG. 3 illustrates the production period of the MPW shuttle according to one embodiment of the present invention. Complete production of the MPW shuttle has four periods. In period P1, before metal layering, the production line 240 processes the MPW shuttle including the original wafers and the coinsurance wafers with a common fabrication process, such as poly fabrication. After the common fabrication process finishes, the MPW shuttle is split into a plurality of child lots according to the metal layering technology, such as the number of metal layers of each device designs, in which one child lot includes the coinsurance wafers, and is withheld from the metal layering fabrication process. In this case, the wafers 300 of the MPW shuttle are split into four child lots 310, 320, 330 and 340, of which child lot 340 includes the coinsurance wafers. Subsequently, in period P3, respective child lots (310, 320 and 330) are processed with different metal layering fabrication processes. After metal layering fabrication, in period P4, products (311, 312, 321, 322, 331, 332 and 333) corresponding to respective device designs are produced, with the delivery unit 270 delivering the products to corresponding clients/device owners.

It is understood that the production line 240 may release the coinsurance wafers to replace original wafers scrapped in the common fabrication process, and process them with the corresponding metal layering fabrication process.

In addition, in period P4, the order management unit 230 may receive a request for at least one designated device design before a cutoff date (COD) of the MPW shuttle. Once the request is received, if there are enough coinsurance wafers to support the request, the production line 240 may release a requested quantity of the coinsurance wafers, and process them with the corresponding metal layering fabrication processes. The cutoff date of the MPW shuttle can be determined by the order management unit 230 or the MES 250.

The MES 250 may collect related information of the MPW shuttle from the production line 240 and the order management unit 230, which may include process status of the original wafers and/or the coinsurance wafers, the consumption status of the coinsurance wafers, and the cutoff date at which the coinsurance wafers will be scrapped.

FIGS. 4A and 4B show an example of the information of the MPW shuttle. In table 400, there are 11 device designs in the MPW shuttle, and the information includes columns for customer code, device name, lot ID, wafer ID, technology, fab, tape-in date, process, #P#M (layers of poly and metal), user type, committed date and coinsurance wafer ID of each device designs.

The transmission unit 260 may automatically and periodically transmit the information to the device owner via a network, such as the Internet. It is understood that due to confidentiality considerations, the transmission unit 260 transfers the information of the coinsurance wafers and the original wafers to the corresponding device owner only. For example, the client J181 may only receive the information for row 410 of the table 400.

Figure 5A:
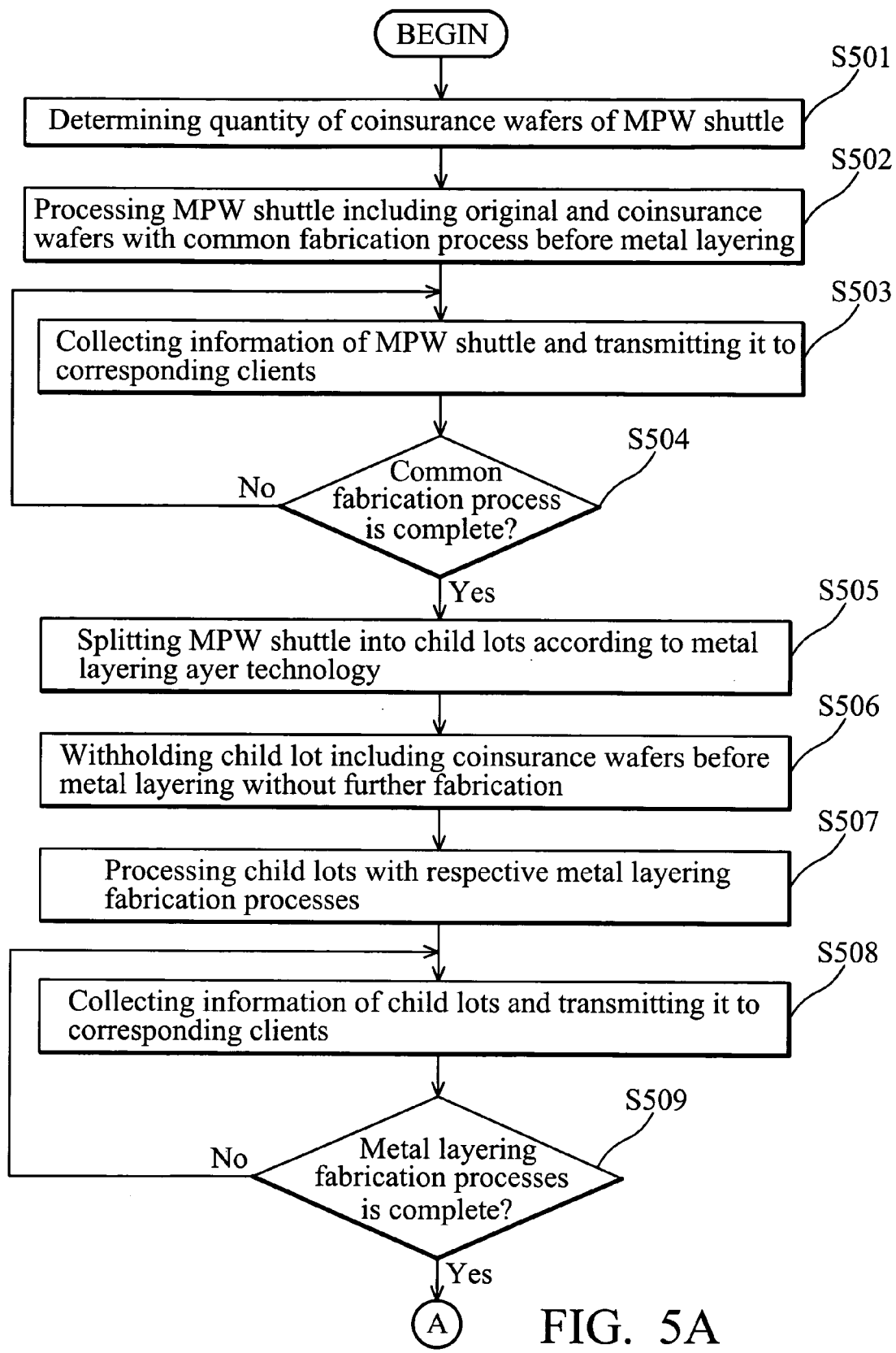
FIGS. 5A and 5B are flowcharts showing the process of the coinsurance wafer management method according to one embodiment of the present invention.
Figure 5B:
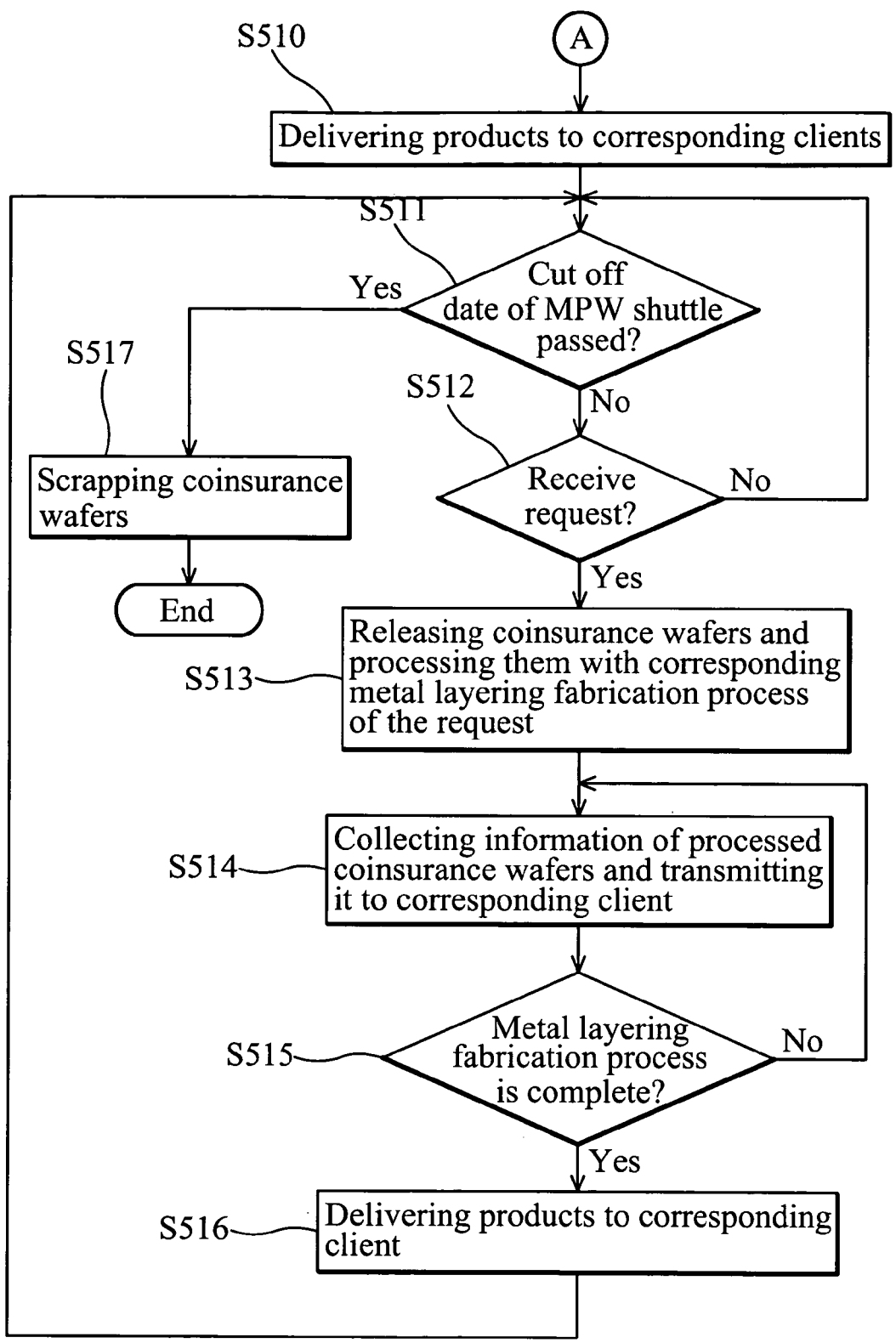

FIGS. 5A and 5B show the coinsurance wafer management method according to one embodiment of the present invention.

In step S501, the determination unit 220 determines the quantity of coinsurance wafers according to a scrapping rate and the quantity of the original wafers reserved in the MPW shuttle. In step S502, the production line 240 processes the MPW shuttle including the original wafers and the coinsurance wafers with a common fabrication process before metal layering. At the same time, in step S503, the MES 250 collects related information of the MPW shuttle from the production line 240, and the transmission unit 260 automatically and periodically transmits the information to the device owner via the network. In step S504, it is determined whether the common fabrication process is complete. If not (No in step S504), the flow returns to step S503. It is understood that the production line 240 may release the coinsurance wafers to replace the original wafers if scrapped in the common fabrication process.

If the common fabrication process has finished (Yes in step S504), in step S505, the MPW shuttle is split into a plurality of child lots according to the metal layering technology of each device design, in which one of the child lots includes the coinsurance wafers, and in step S506, the child lot including the coinsurance wafers is withheld before metal layering without further fabrication.

Afterward, in step S507, the production line 240 processes respective child lots with different metal layering fabrication processes according to corresponding device design. At the same time, in step S508, the MES 250 collects related information of the child lots from the production line 240, and the transmission unit 260 automatically and periodically transmits the information to the device owner via the network. In step S509, it is determined whether the metal layering fabrication processes is complete. If not (No in step S509), the flow returns to step S508. It is understood that if original wafers are scrapped in the metal layering fabrication process, the production line 240 may release the coinsurance wafers and process them with the metal layering fabrication process corresponding to the scraped original wafers. If the metal layering fabrication processes have finished (Yes in step S509), whereby the products corresponding to each device designs are produced, in step S510, the delivery unit 270 delivers the products to corresponding device owners.

In step S511, it is determined whether a cutoff date of the MPW shuttle has passed. If not (No in step S511), in step S512, it is determined whether a request has been received from the device owners. If not (No in step S512), the flow returns to step S511. If a request designating one of the device designs of the MPW shuttle is received and there are enough coinsurance wafers to support the request (Yes in step S512), in step S513, the production line 240 releases a requested quantity of the coinsurance wafers, for processing with the corresponding metal layering fabrication process. Similarly, at the same time, in step S514, the MES 250 collects related information for the processed coinsurance wafers from the production line 240, and the transmission unit 260 automatically and periodically transmits the information to the device owner via the network.

In step S515, it is determined whether the metal layering fabrication process is complete. If not (No in step S515), the flow returns to step S514. If the metal layering fabrication process has finished (Yes in step S515), in step S516, the delivery unit 270 delivers the products to the device owner. Further, if the cutoff date of the MPW shuttle passes (Yes in step S511), in step S517, the remaining coinsurance wafers are scrapped. It is understood that a line out of step S516 goes back to step S511, illustrating the description of the process and allowing for multiple requests before the cut off date.

Figure 6:
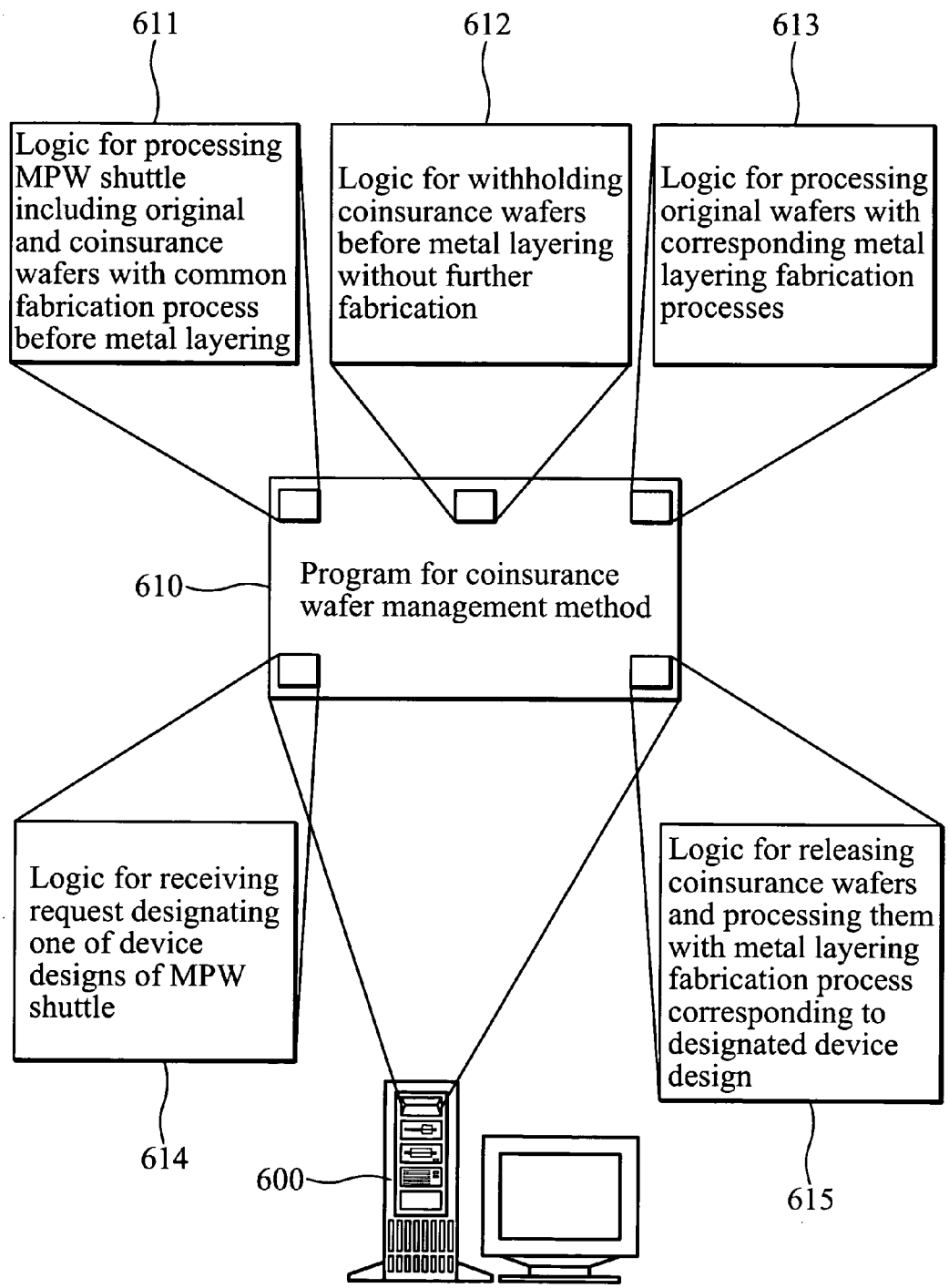
FIG. 6 is a schematic diagram illustrating a storage medium for storing a computer program providing the coinsurance wafer management method.

FIG. 6 is a diagram of a storage medium for storing a computer program providing the coinsurance wafer management method according to the present invention. The computer program product comprises a storage medium 610 having computer readable program code embodied in the medium for use in a computer system 600, the computer readable program code comprising at least computer readable program code processing a MPW shuttle including original and coinsurance wafers with a common fabrication process before metal layering, computer readable program code 612 withholding the coinsurance wafers before metal layering without further fabrication, computer readable program code 613 processing the original wafers with corresponding metal layering fabrication processes, computer readable program code 614 receiving at least a request designating one of device designs of the MPW shuttle, and computer readable program code 615 releasing the coinsurance wafers for processing with the corresponding metal layering fabrication process.

As a result, the present invention provides a system and method of coinsurance wafer management in the MPW shuttle service that manages the process scheduling of the coinsurance wafers. The novel mechanism directs the coinsurance wafers to be processed with common fabrication processes, and withholds them before metal layering, such that time for remaining fabrication is reduced if the coinsurance wafers are needed as supplements. In addition, the new business model of the present invention provides sufficient information for the coinsurance wafers to clients and makes good use of the coinsurance wafers, thereby reducing the cycle time of another wafer start and related costs.

The method and system of the present invention, or certain aspects or portions thereof, may take the form of program code (i.e., executable instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The method and systems of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to application specific logic circuits.

Although the present invention has been described in its preferred embodiments, it is not intended to limit the invention to the precise embodiments disclosed herein. Those skilled in this technology can still make various alterations and modifications without departing from the scope and spirit of this invention. Therefore, the scope of the present invention shall be defined and protected by the following claims and their equivalents.

What is claimed is:

1. A system of coinsurance wafer management for use in MPW (multi-project wafer) shuttle service, comprising at least:
   a production line to process at least a MPW shuttle including a plurality of original wafers and a quantity of coinsurance wafers with a common fabrication process before metal layering, process the original wafers with different metal layering fabrication processes according to a metal layering technology of each device design of the MPW shuttle, and withhold the coinsurance wafers without further fabrication,
   wherein the production line releases at least one of the coinsurance wafers to replace each original wafer scrapped in the common fabrication process.

2. The system of claim 1 wherein the MPW shuttle is split into a plurality of child lots according to the metal layering technology of each device design of the MPW shuttle when the common fabrication process is complete, in which one child lot comprises the coinsurance wafers, and the other child lots are processed with different metal layering fabrication processes.

3. The system of claim 1 wherein the production line further releases at least one of the coinsurance wafers, and processes it with the metal layering fabrication process corresponding to each original wafer scrapped in the metal layering fabrication process.

4. The system of claim 1 further comprising a delivery unit to deliver respective products of each device design fabricated from the original wafers to corresponding clients.

5. The system of claim 1 further comprising an order management unit to receive a request for at least one designated device design of the device designs after the metal layering fabrication processes.

6. The system of claim 5 wherein the request is received before a cutoff date of the MPW shuttle.

7. The system of claim 5 wherein the production line further releases at least one coinsurance wafer for processes with the corresponding metal layering fabrication process when the request is received.

8. The system of claim 1 further comprising a transmission unit to transfer information of the coinsurance wafers to clients via a network.

9. The system of claim 8 wherein the transmission unit further transfers information of the original wafers corresponding to the respective device designs to the corresponding clients.

10. The system of claim 1 wherein the metal layering technology is the number of metal layers of each device design.

11. The system of claim 1 further comprising a determination unit to determine the quantity of coinsurance wafers according to a scrapping rate and the quantity of the original wafers.

12. A method of coinsurance wafer management for use in MPW (multi-project wafer) shuttle service, comprising the steps of:
   processing at least one MPW shuttle with a common fabrication process before metal layering, in which the MPW shuttle includes a plurality of original wafers and a quantity of coinsurance wafers;
   processing the original wafers with different metal layering fabrication processes according to a metal layering technology of each device design of the MPW shuttle;
   withholding the coinsurance wafers without further fabrication; and
   releasing at least one of the coinsurance wafers to replace each original wafer scrapped in the common fabrication process.

13. The method of claim 12 further comprising splitting the MPW shuttle into a plurality of child lots according to the metal layering technology of each device design of the MPW shuffle when the common fabrication process is complete, in which one child lot comprises the coinsurance wafers, and the other child lots are processed with different metal layering fabrication processes.

14. The method of claim 12 further comprising releasing at least one of the coinsurance wafers, and processing it with the metal layering fabrication process corresponding to each original wafer scrapped in the metal layering fabrication process.

15. The method of claim 12 further comprising delivering respective products of each device design fabricated from the original wafers to corresponding clients.

16. The method of claim 12 further comprising receiving a request for at least one designated device design after the metal layering fabrication processes.

17. The method of claim 16 wherein the request is received before a cutoff date of the MPW shuttle.

18. The method of claim 16 further comprising releasing at least one of the coinsurance wafers for processing with the corresponding metal layering fabrication process when the request is received.

19. The method of claim 12 further comprising transferring information of the coinsurance wafers to clients via a network.

20. The method of claim 19 further comprising transferring information of the original wafers corresponding to the respective device designs to the corresponding clients.

21. The method of claim 12 wherein the metal layering technology is the number of metal layers of each device design.

22. The method of claim 12 further comprising determining the quantity of coinsurance wafers according to a scrapping rate and the quantity of the original wafers.

23. A machine-readable storage medium storing a computer program which when executed causes a computer to perform a method of coinsurance wafer management for use in MPW (multi-project water) shuffle service, comprising the steps of:
   processing at least one MPW shuttle with a common fabrication process before metal layering, in which the MPW shuttle includes a plurality of original wafers and a quantity of coinsurance wafers;
   processing the original wafers with different metal layering fabrication processes according to a metal layering technology of each device design of the MPW shuttle;
   withholding the coinsurance wafers without further fabrication; and releasing at least one of the coinsurance wafers to replace each original wafer scrapped in the common fabrication process.

24. The storage medium of claim 23 further comprising splitting the MPW shuttle into a plurality of child lots according to the metal layering technology of each device design of the MPW shuttle when the common fabrication process is complete, in which one child lot comprises the coinsurance wafers, and the other child lots are processed with different metal layering fabrication processes.

25. The storage medium of claim 23 further comprising releasing at least one of the coinsurance wafers for each original wafer scraped in the common fabrication process for processing with the corresponding metal layering fabrication process.

26. The storage medium of claim 23 further comprising delivering respective products of each device designs fabricated from the original wafers to corresponding clients.

27. The storage medium of claim 23 further comprising receiving a request for at least one designated device design of the device designs after the metal layering fabrication processes.

28. The storage medium of claim 27 wherein the request is received before a cutoff date of the MPW shuttle.

29. The storage medium of claim 27 further comprising releasing at least one of the coinsurance wafers, and processing it with the corresponding metal layering fabrication process when the request is received.

30. The storage medium of claim 23 further comprising transferring information of the coinsurance wafers to clients via a network.

31. The storage medium of claim 30 further comprising transferring information of the original wafers corresponding to the respective device designs to the corresponding clients.

32. The storage medium of claim 23 wherein the metal layering technology is the number of metal layers of each device design.

33. The storage medium of claim 23 further comprising determining the quantity of coinsurance wafers according to a scrapping rate and the quantity of the original wafers.

* * * * *